(12) United States Patent
Choi

(10) Patent No.: US 8,801,976 B2
(45) Date of Patent: *Aug. 12, 2014

(54) PHOTOCHROMIC MATERIAL

(71) Applicant: Korea University Research and Business Foundation, Seoul (KR)

(72) Inventor: Dong Hoon Choi, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/629,975

(22) Filed: Sep. 28, 2012

(65) Prior Publication Data

US 2014/0191168 A1 Jul. 10, 2014

Related U.S. Application Data

(62) Division of application No. 12/683,238, filed on Jan. 6, 2010, now Pat. No. 8,298,453.

(51) Int. Cl.
*G02B 5/23* (2006.01)
*C07D 265/12* (2006.01)
*C07D 265/00* (2006.01)

(52) U.S. Cl.
USPC ........... 252/586; 252/582; 252/600; 436/164; 544/71; 544/89; 548/509

(58) Field of Classification Search
USPC ............. 252/582, 586, 600; 436/164; 544/71, 544/89; 548/509
See application file for complete search history.

(56) References Cited

U.S. PATENT DOCUMENTS

| | | | |
|---|---|---|---|
| 4,968,454 A | 11/1990 | Crano et al. | |
| 6,004,486 A | 12/1999 | Chan | |
| 6,068,797 A | 5/2000 | Hunt | |
| 8,287,775 B2 * | 10/2012 | Choi | 252/586 |
| 8,298,453 B2 | 10/2012 | Choi | |
| 2003/0045714 A1 | 3/2003 | Melzig et al. | |
| 2007/0195309 A1 * | 8/2007 | Marriott et al. | 356/51 |
| 2008/0055686 A1 | 3/2008 | Erben et al. | |
| 2009/0032782 A1 | 2/2009 | Kim et al. | |
| 2009/0280060 A1 * | 11/2009 | Marriott et al. | 424/9.1 |
| 2011/0163282 A1 | 7/2011 | Choi | |
| 2011/0198546 A1 | 8/2011 | Choi | |

FOREIGN PATENT DOCUMENTS

| | | |
|---|---|---|
| EP | 1433620 | 6/2004 |
| JP | 63303983 | 12/1988 |
| JP | 3-81278 | 4/1991 |
| JP | H03502340 | 5/1991 |
| JP | 5-43870 | 2/1993 |
| JP | 5-65477 | 3/1993 |
| JP | 05273692 | 10/1993 |
| JP | 7-228584 | 8/1995 |
| JP | 11256146 | 9/1999 |
| WO | WO 2009/146509 A1 * | 12/2009 ............. C08G 77/38 |
| WO | WO 2010/020770 | 2/2010 |

OTHER PUBLICATIONS

F. Ortica, D. Levi, P. Brun, R. Guglielmetti, U. Mazzucato, G. Favaro, Photokinetic behaviour of biphotochromic supramolecular systems Part 2. A bis-benzo-[2H]-chromene and a spirooxazine—chromene with a (Z-)ethenic bridge between each moiety, Journal of Photochemistry and Photobiology A: Chemistry 139 (2001) 133-141.*

Gerasimos M. Tsivgoulis a nd Jean•Maric Lehn, Photonic Molecular Devices: Reversibly Photoswitchable Fluorophores for Nondestructive Readout for Optical Memory, Angew. Chem. Int. Ed. Engl. 1995, 34, No. 10, p. 119-1121.*

Xiaoliu Li, Jinliang Li, Yongmei Wang, Teruo Matsuura, Jiben Meng, Synthesis of functionalized spiropyran and spirooxazine derivatives and their photochromic properties, Journal of Photochemistry and Photobiology A: Chemistry 161 (2004) 201-213. © 2004 Elsevier B.V. All rights reserved.*

Guglielmetti, R., 'New polyphotochromic system involving spirooxazine and/or chromene joined by a (Z) ethylenic bridge', Advances in Colour Science and Technology, 2002, vol. 5 (4), pp. 113-116.

International Search Report for PCT/KR2010/009127 mailed Apr. 2, 2011.

International Search Report for PCT/KR2010/009128 mailed Apr. 2, 2011.

Ortica, F. et al., 'Photokinetic behaviour of biphotochromic supra molecular systems Part 2. A bis-benzo-[2H]-chromene and a spirooxazine-chromene with a (Z-)ethenic bridge between each moiety', J. Photochem. Photobiol. A: Chemistry, 2001, vol. 139, pp. 133-141.

Yip, W. T. et al., 'Energy Transfer in Bichromophoric Molecules: The Effects of Symmetry and Donor/Acceptor Energy Gap', J. Phys. Chem. A, 1999, vol. 103, pp. 10-20.

Tsivgoulis, Gerasimo M. et al., "Photonic Molecular Devices: Reversibly Photoswitchable Fluorophores for Nondestructive Readout for Optical Memory", Angew. Chem. Int. Ed. Engl. 1995, 34, No. 10, pp. 119-1121.

U.S. Appl. No. 12/683,238, Mar. 18, 2011, Office Action.
U.S. Appl. No. 12/683,238, May 17, 2011, Office Action.
U.S. Appl. No. 12/683,238, Oct. 20, 2011, Office Action.
U.S. Appl. No. 12/683,238, Jun. 29, 2012, Notice of Allowance.
U.S. Appl. No. 12/707,498, Mar. 18, 2011, Office Action.

(Continued)

*Primary Examiner* — Bijan Ahvazi
(74) *Attorney, Agent, or Firm* — Workman Nydegger

(57) ABSTRACT

Photochromic dyes are disclosed. A photochromic dye can include a first photo-reactive group and a second photo-reactive group. A first photochromic reaction can be induced in the first photo-reactive group of the photochromic dye by radiation having a first wavelength, and a second photochromic reaction can be induced in the second photo-reactive group of the photochromic dye by radiation having a second wavelength.

12 Claims, No Drawings

(56) References Cited

OTHER PUBLICATIONS

U.S. Appl. No. 12/707,498, May 2, 2011, Office Action.
U.S. Appl. No. 12/707,498, Oct. 13, 2011, Office Action.
U.S. Appl. No. 12/707,498, Jul. 2, 2012, Notice of Allowance.
U.S. Appl. No. 12/683,238, Oct. 10, 2012, Issue Notification.
U.S. Appl. No. 12/707,498, Sep. 26, 2012, Issue Notification.

\* cited by examiner

PHOTOCHROMIC MATERIAL

CROSS-REFERENCE TO RELATED APPLICATIONS

This application is a division of U.S. application Ser. No. 12/683,238 filed on 6 Jan. 2010, the contents of which are incorporated, in its entirety, by this reference.

TECHNICAL FIELD

This disclosure relates generally to photochromic materials.

BACKGROUND

A number of photochromic materials are used in many industrial fields. The absorption spectra and thus the color of photochromic materials can change as a result of the absorption of electromagnetic radiation (e.g., visible or UV light).

Many photochromic materials possess color change properties due to the phenomenon of photochromism. Photochromism refers to a reversible, light-induced transformation of a chemical compound between at least two forms. The at least two forms inherently have different absorption spectra, so they exhibit different colors. A photochromic dye is a photochromic material exhibiting light-dependent color change properties. Absorption of light radiation can reversibly transform a photochromic dye between two forms having different absorption spectra, so as to exhibit different colors.

SUMMARY

One embodiment of the disclosure describes a photochromic dye. The photochromic dye can include at least two photo-reactive groups. In one aspect, a first photo-reactive group is configured to undergo a first photochromic reaction in response to radiation having first wavelength, and a second photo-reactive group is configured to undergo a second photochromic reaction in response to radiation having second wavelength.

According to another embodiment, a photochromic dye is described. The photochromic dye can include at least two photo-reactive groups that are coupled to one another, wherein a first photo-reactive group and a second photo-reactive group are independently at least one structure selected from the group consisting of Formula I and II:

[Formula I]

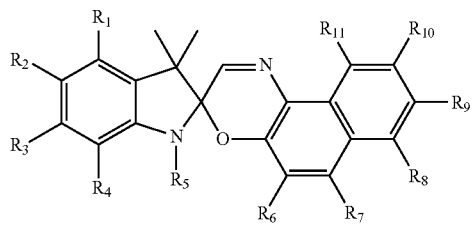

[Formula II]

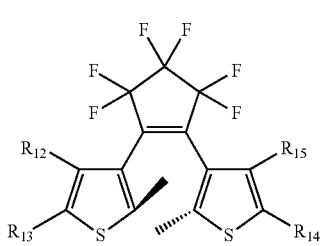

wherein, $R_1$ to $R_{15}$ independently represent hydrogen, a halogen, a substituted or unsubstituted $C_{1-12}$ alkyl, a substituted or unsubstituted $C_{1-12}$ alkoxy, a substituted or unsubstituted $C_{1-12}$ alkenyl, a substituted or unsubstituted $C_{1-12}$ conjugated alkyl, a substituted or unsubstituted aryl group, or a substituted or unsubstituted heteroaryl group, or the substituents together form an alkylene or alkenylene chain completing an aryl group.

According to yet another embodiment, photochromic composition is described. In one aspect, the photochromic composition can include at least one material selected from the group consisting of a polymer, an oligomer, a monomer, or a mixture thereof, and at least one photochromic dye incorporated into at least a portion of the material. In one aspect, the at least one photochromic dye can include at least two photo-reactive groups that are coupled to one another, wherein a first photo-reactive group is configured to undergo a first photochromic reaction in response to radiation having first wavelength, and a second photo-reactive group is configured to undergo a second photochromic reaction in response to radiation having second wavelength.

According to still yet another embodiment, an optical article is described. In one aspect, the optical article can include at least one optical article selected from the group consisting of ophthalmic elements, display elements, windows, mirrors, liquid crystal cell elements, and combinations thereof, and at least one photochromic dye incorporated into at least a portion of the optical article. In one aspect, the at least one photochromic dye can include at least two photo-reactive groups that are coupled to one another, wherein a first photo-reactive group is configured to undergo a first photochromic reaction in response to radiation having first wavelength, and a second photo-reactive group is configured to undergo a second photochromic reaction in response to radiation having second wavelength.

The foregoing summary is illustrative only and is not intended to be in any way limiting. In addition to the illustrative aspects, embodiments, and features described above, further aspects, embodiments, and features will become apparent by reference to the following detailed description.

DETAILED DESCRIPTION

I. Introduction and Definitions

In the following detailed description, reference is made to the accompanying structural formulas, which form a part hereof. In the structural formulas, similar symbols typically identify similar components, unless context dictates otherwise. The illustrative embodiments described in the detailed description, structural formulas, and claims are not meant to be limiting. Other embodiments may be utilized, and other changes may be made, without departing from the spirit or scope of the subject matter presented here.

A photochromic dye according to the present disclosure refers to a photochromic material (e.g., a chemical dye) that can exhibit two or more color changes as the wavelength of irradiation changes. A photochromic dye as described herein can be formed by linking two or more photo-reactive groups having different reactivities together in a single molecule. In one aspect, the two or more photo-reactive groups can be linked by a non-conjugated linkage.

The term "non-conjugated linkage" as used herein refers to a chemical linkage connecting two photochromic groups without a conjugation system. Since two photochromic groups are linked by the non-conjugated linkage, each photochromic group undergoes respective photochromic reactions in response to the specific wavelength of light and exhibit a specific color change.

A photochromic dye as described herein can be transformed from a colorless isomer to at least two colored isomers by the absorbance of light radiation. As such, the term "light radiation" as used herein refers to electromagnetic radiation such as, but not limited to, ultraviolet and visible radiation that is capable of causing a photo-reactive chromic group to transform from one form to another.

As used herein, the term "isomer" refers to isomers chemical compounds having the same molecular formula but different structural formulas. For example, a ring-opening or a ring-closing isomerization reaction alters the bonding structure and will generally alter the electronic properties of a molecule without altering the molecular formula. While the stability of photo-induced isomers varies from compound to compound, photo-induced isomers will generally back isomerize over time and/or in response to heat or absorbance of light radiation.

The term "photo-reactive group" as used herein means any substance having photo-reactive properties. Transformation of a photo-reactive group from one form to another can be induced by absorption of electromagnetic radiation (e.g., UV or visible light radiation). That is, a photo-reactive group can transform from one form to another form, each form having different absorption spectra so as to exhibit different colors, by absorbing light radiation.

In one aspect, a photo-reactive group can include a photochromic group. In one aspect, a photochromic reaction can be a color-change reaction that occurs in a photochromic group. As such, the transformation from one form to the other can include a photochromic reaction that causes or induces a change in the absorption spectrum of the dye such that the two forms exhibit different colors.

The term "photochromic moiety" as used herein refers to a part or portion of a photo-reactive group, in which a photochromic reaction occurs in order to undergo a reversible photochromic transformation from one form to another.

The term "ring-opening or closing reaction," as used herein, refers to a ring-opening reaction or ring-closing reaction that happens when a photochromic group absorbs light radiation. According to the species of the photochromic group, a ring-opening reaction or a ring-closing reaction takes place. For example, spiropyrans and spirooxazines undergo a ring-opening reaction in response to light radiation, whereas diarylethenes and fulgides undergo a ring-closing reaction in response to light radiation.

The term "conjugation system" as used herein refers to a system where atoms covalently bond with alternating single and double bonds. In one aspect, a first photochromic reaction, as disclosed herein, can include a modification of a first conjugation system in a first photo-reactive group, and a second photochromic reaction can include modification of a second conjugation system in a second photo-reactive group. For example, absorbance of a photon of light having a given wavelength can induce the transformation of a conjugation system in a first photo-reactive group from a conjugation system having a first conjugation bond length to a conjugation system having a second and generally longer conjugation bond length. It is generally the case that the absorption spectra of molecules and thus their color changes as the conjugation bond length changes. In general, conjugation systems having less than eight conjugated double bonds only absorb light in the ultraviolet region and are colorless to the human eye. With the addition of additional conjugated double bonds (i.e., an increase in the conjugation bond length), the conjugation system absorbs photons of longer wavelength (and lower energy), eventually resulting in the absorbance of photons in the visual range of the human eye.

Thus, the photochromic reactions discussed herein can induce the transformation of a photochromic dye having at least two photo-reactive groups from a colorless isomer having a first conjugation bond length to at least two separate isomers having different and longer conjugation bond length systems that are capable of absorbing photons in the visual range of the human eye. As such, a colorless isomer of a photochromic dye can be transformed to an isomer having a first color (e.g., colorless to blue), or a colorless isomer of a photochromic dye can be transformed to an isomer having a second color (e.g., colorless to green). It is also possible for a colorless isomer of a photochromic dye to be transformed to an isomer having a third color (e.g., colorless to cyan), wherein the colors produced by the first and second photo-reactive groups are blended in response to the first and second photo-reactive groups being isomerized more-or-less simultaneously.

For example, Scheme I below shows a ring-opening reaction of a spirooxazine in response to UV light irradiation. The spirooxazine shown in Scheme I includes a photo-reactive group and the compound can be termed "photochromic" because the spirooxazine changes its absorption properties, and thus its color, in response to UV irradiation. The spiro form of an oxazine is a colorless leuco dye having a conjugated oxazine and another conjugated aromatic portion separated by an $sp^3$ hybridized spiro carbon (represented by *). After irradiation with UV light, the bond between the spiro carbon and the oxazine breaks, opening the ring. As a result, the spiro carbon switches to an $sp^2$ hybridization state and becomes planar, the aromatic group rotates, and an extended conjugation system is formed. The formation of the extended conjugation system allows the molecule to absorb photons of visible light, and therefore appear colorful. When the UV source is removed, the molecule will gradually relax to its ground state, the carbon-oxygen bond reforms, the spiro-carbon becomes $sp^3$ hybridized again, and the molecule returns to its colorless state.

[Scheme I]

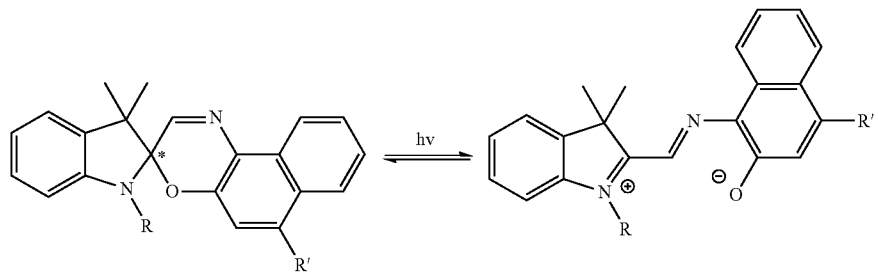

Each photochromic group has its own absorption maximum which can induce a photochromic reaction. As used herein, the term "absorption maximum" refers to the specific wavelength at which an absorbance of a material is at its maximum. Extending conjugation length generally results in a shift of the absorption maximum to longer wavelengths. The absorbance of the material (or the amount of radiation absorbed by the material) can be determined using a spectrophotometer by exposing the material to incident radiation having a particular wavelength and intensity and comparing the intensity of radiation transmitted by the material to that of the incident radiation. For each wavelength tested, the absorbance ("A") of the material is given by the following equation:

$$A = \log I_0/I$$

wherein "$I_0$" is the intensity of the incident radiation and "$I$" is the intensity of the transmitted radiation. An absorption spectrum for a material can be obtained by plotting the absorbance of the material vs. wavelength. By comparing the absorption spectrum of photochromic materials that were tested under the same conditions, that is using the same concentration and path length for electromagnetic radiation passing through the sample (e.g., the same cell length or sample thickness), an increase in the absorbance of one of the materials at a given wavelength can be seen as an increase in the intensity of the spectral peak for that material at that wavelength.

As can be appreciated from the preceding discussion, when the photochromic dyes disclosed herein are exposed to radiation having the appropriate wavelength, the first or the second photo-reactive group, can undergo a structural rearrangement, e.g., a ring-opening or closing reaction, and/or a cis-trans isomerization, to alter the conjugation system in the first or the second photo-reactive group. Extending the conjugation system in response to the first or the second photochromic allows the dye to absorb photons of longer wavelength, which gives the dye its color.

Scheme II shown below represents an example of two photochromic reactions according to one embodiment of the disclosure. The photochromic dye shown in Scheme II includes two photo-reactive groups connected by a non-conjugated linkage. The photochromic reactions shown in Scheme II are ring-opening reactions that occur in response to absorbance of different wavelengths of light ($\lambda_1$ and $\lambda_2$).

[Scheme II]

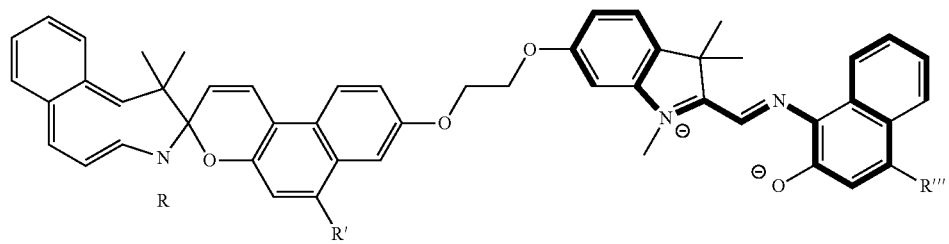

[Scheme II-2]

-continued

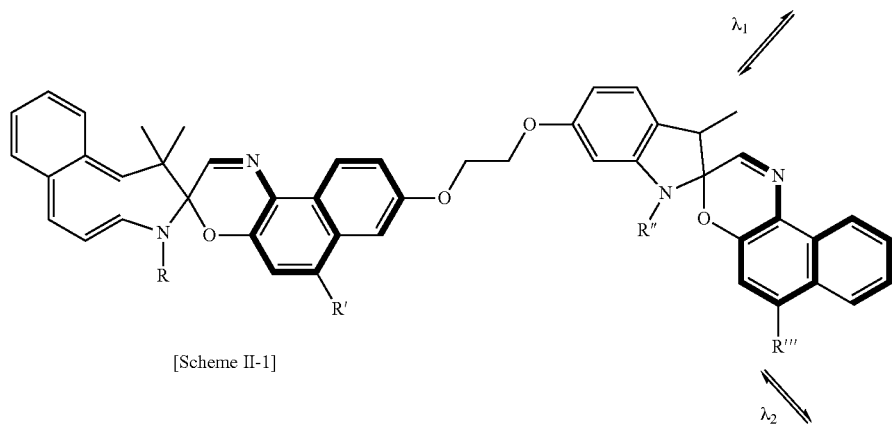

[Scheme II-1]

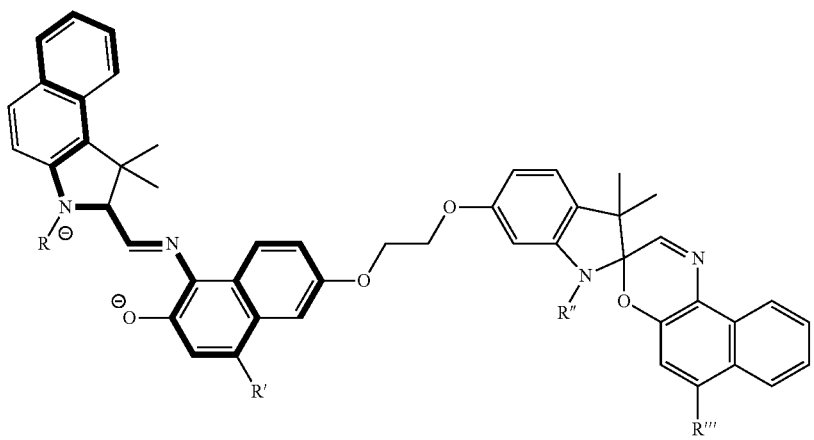

[Scheme II-3]

As shown in Scheme II-1, the two separate conjugation systems of the dye indicated by the bold lines each include six conjugated double bonds and are thus too short to for the isomer shown in Scheme II-1 to absorb visible light. As mentioned above, it is generally the case that conjugation systems having less than eight conjugated double bonds only absorb light in the ultraviolet region and are colorless to the human eye. However, the absorption spectra of molecules and thus their color changes as the conjugation bond length changes. That is, additional double bonds in the conjugation system allow the molecule to absorb photons of longer wavelength (and lower energy), which eventually results in the compound having a color that can be seen by the human eye.

Referring now to Schemes II-1 and II-2, when light having a first wavelength ($\lambda_1$) is absorbed by the first compound (Scheme II-1), the first photochromic group having an absorption maximum corresponding to the first wavelength undergoes the first photochromic reaction. Since the conjugation system is extended to ten conjugated double bonds (scheme II-2, bold line), the dye can absorb visible light to exhibit color.

Referring now to Schemes II-1 and II-3, when light having a second wavelength ($\lambda_2$) is absorbed by the first compound (Scheme II-1), the second photochromic group having an absorption maximum corresponding to the second wavelength undergoes the second photochromic reaction. Since the conjugation system is extended to eleven conjugated double bonds (scheme II-3, bold line), the dye can absorb visible light to exhibit color. Because the conjugation bond length of the second photochromic group is different from the first photochromic group (i.e., eleven conjugated double bonds vs. ten conjugated double bonds), the isomer shown in Scheme II-3 will exhibit a different color that is different that the color exhibited by the isomer shown in Scheme II-2.

Scheme III shown below represents another example of two photochromic reactions according to one embodiment of the disclosure. The photochromic dye shown in Scheme III includes two photo-reactive groups connected by a non-conjugated linkage. The photochromic reactions shown in Scheme III are ring-closing reactions that occur in response to absorbance of different wavelengths of light ($\lambda_1$ and $\lambda_2$).

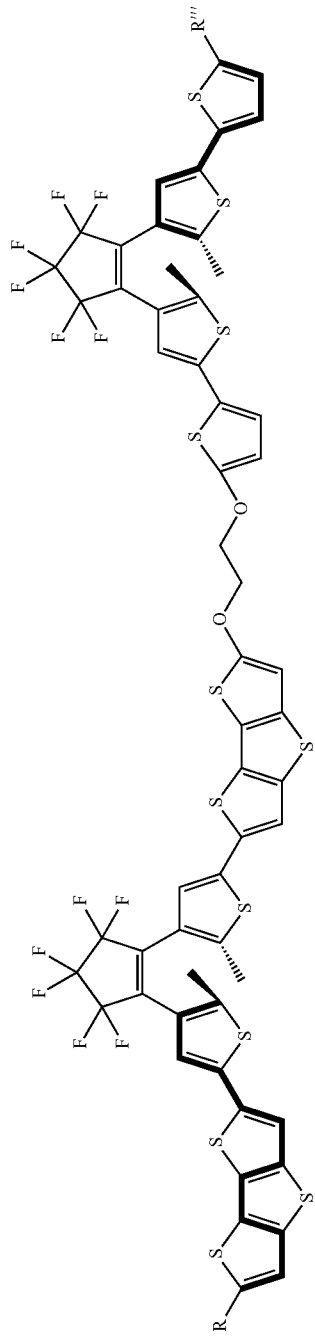
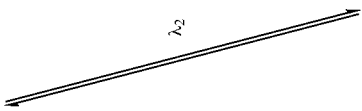
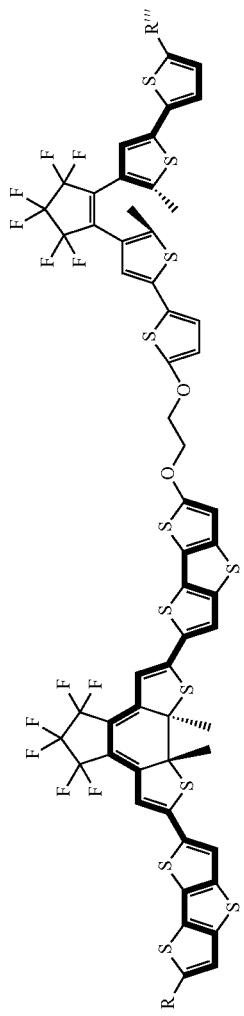

As shown in scheme III, two diarylethene photo-reactive groups are coupled to one another by a non-conjugated linkage. As in scheme II, the two separate conjugation systems of the dye indicated by the bold lines are too short for the isomer shown in Scheme III-1 to absorb visible light. However, when light having a different wavelength ($\lambda_1$ or $\lambda_2$) is absorbed by the dye (Scheme III-1), each photochromic group having an absorption maximum corresponding to each wavelength undergoes a photochromic reaction. Since the conjugation system is extended to eight or more conjugated double bonds (Scheme III-2 and III-3, bold line), the dye can absorb visible light to exhibit color. Because the conjugation bond lengths of the two photochromic groups differ from each other (i.e., eight conjugated double bonds in Scheme III-2 vs. twelve conjugated double bonds in Scheme III-3), the isomer shown in Scheme III-3 will exhibit a different color that is different than the color exhibited by the isomer shown in Scheme III-2.

II. Photochromic Dyes

Embodiments of the present disclosure relate to photochromic dyes. Photochromic dyes are dyes that exhibit the ability to reversibly change color in response to absorption of electromagnetic radiation. The photochromic dyes disclosed herein possess at least two photo-reactive groups, allowing the photochromic dyes to reversibly transform between at least two forms having at least two different colors.

In one embodiment, the photochromic dyes disclosed herein can include at least two photo-reactive groups. In one aspect, a first photo-reactive group is configured to undergo a first photochromic reaction in response to radiation having first wavelength, and a second photo-reactive group is configured to undergo a second photochromic reaction in response to radiation having second wavelength.

In one aspect, the first and the second photo-reactive groups are coupled to one another by a non-conjugated linkage. Non-limiting examples of a non-conjugated linkage that can be used to coupled the first and the second photo-reactive groups include, but are not limited to, $C_{1-12}$ alkylenes, $C_{1-12}$ heteroalkylenes, $C_{1-6}$ alkylenoxy compounds, and $C_{1-6}$ alkylenedioxy compounds.

In one aspect, of the photochromic dyes disclosed herein, the first photochromic reaction can include modification of a first conjugation system in the first photo-reactive group, and the second photochromic reaction can include modification of a second conjugation system in the second photo-reactive group. That is, for example, the first photochromic reaction can include lengthening the conjugation bond length of the conjugation system in the first photo-reactive group to the extent that the first photo-reactive group can absorb photons of visible light. Likewise, the second photochromic reaction can include lengthening the conjugation bond length of the conjugation system in the second photo-reactive group to the extent that the first photo-reactive group can absorb photons of visible light. In some aspects, a modification of a conjugation system can include a shortening of a conjugation bond length such that, for example, a colored compound becomes colorless.

As such, in one aspect, the first conjugation system can have a first conjugation bond length and the second conjugation system can have a second conjugation bond length that is different than the first conjugation bond length.

Several non-limiting examples of isomerization reactions that can modify the first conjugation system in the first photo-reactive group and/or modify the second conjugation system in the second photo-reactive group independently include, but are not limited to at least one of a pericyclic reaction, a cis-trans isomerization, an intramolecular hydrogen transfer, an intramolecular group transfer, a dissociation process, an electron transfer reaction, a ring-opening reaction, or a ring closing reaction.

To illustrate the formation of a conjugation system that allows a molecule to appear colorful, Scheme I will be referred to below.

[Scheme 1]

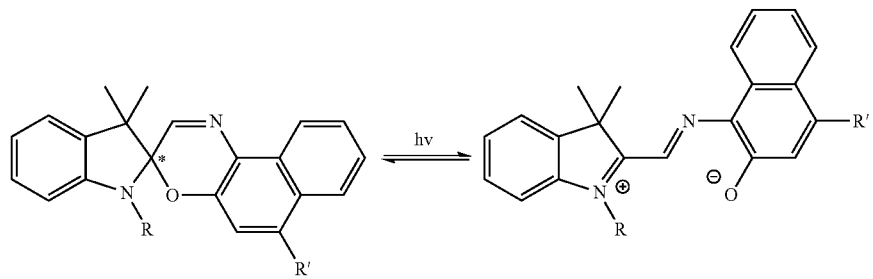

In the absence of irradiation, the spirooxazine shown on the left-hand portion of Scheme I includes two separated portions having conjugated double bonds. That is, the conjugated systems of the oxazine on one end of the molecule and the benzene ring on the other end of the molecule are separated by the "spiro" carbon (indicated by *). The presence of the spiro linkage in between the conjugated systems prevents extended overlap of the pi-orbitals from one end of the molecule to the other with the longest conjugation system including six conjugated double bonds. As a result, the non-irradiated from of the spirooxazine is colorless.

In response to irradiation (hv), however, the bond between the spiro-carbon and the oxazine breaks, and a conjugation system forms extending from one end of the molecule to the other. The photo-activated version of the spirooxazine has conjugation system that includes ten conjugated double bonds, which allows the oxazine to absorb visible light and appear colorful.

In contrast to the spirooxazine discussed above, the photochromic dyes disclosed herein can include a first photo-reactive group having a first conjugation system and a second photo-reactive group having a second conjugation system. In one aspect, the first conjugation system can be formed when the first photochromic reaction is induced, and the second conjugation system can be formed when the second photochromic reaction is induced. In one aspect, the first conjugation system has a first conjugation bond length and the second conjugation system has a second conjugation bond length that is longer than the first conjugation bond length.

In one aspect, the first photo-reactive group and the second photo-reactive group have different absorption maxima. For example, according to a non-limiting embodiment, the difference in absorption maximum between the first photo-reactive group and the second photo-reactive group may be greater than or equal to 50 nm, greater than or equal to 100 nm, or greater than or equal to 150 nm. If the difference in absorption maximum between the photochromic groups is more than 50 nm, the first and the second photochromic reactions can be clearly distinguished according to the change of wavelength. For example, the second photochromic group may have an absorption maximum of 400 to 500 nm, 410 to 500 nm, 420 to 500 nm, 430 to 500 nm, 440 to 500 nm, or 450 to 500 nm when the first photochromic group has an absorption maximum of 250 to 350 nm, 250 to 340 nm, 250 to 330 nm, 250 to 320 nm, 250 to 310 nm, or 250 to 300 nm.

According to a non-limiting embodiment, the intensity of irradiation may be 10 to 30 mW/cm$^2$ when the photochromic dye sample according to the present invention is a liquid phase. However, when the photochromic dye sample is a film and the thickness of the film is about 1 μm, the intensity of irradiation may be 100 to 200 mW/cm$^2$. As the thickness of the film is increased, a stronger intensity of irradiation should be used.

In one aspect, the first photochromic reaction produces a first color and the second photochromic reaction produces a second color. For example, the first photochromic reaction can induce a transformation in the photochromic dye from colorless to blue and the second photochromic reaction can induce a transformation in the photochromic dye from colorless to green.

According to a non-limiting embodiment, the photochromic groups may be independently at least one selected from the group consisting of a spiropyran compound, a spirooxazine compound, a diarylethene compound and a fulgide compound.

Non-limiting examples of photochromic diarylethenes from which the photochromic group can be chosen include thiophene perfluoropentenes; benzothiophene perfluoropentenes; benzothiophene maleicanhydrides; benzothiophene cyanoethenes; and benzothiophene sulfone perfluoropentenes.

Non-limiting examples of photochromic fulgides from which the photochromic group can be chosen include the 3-furyl and 3-thienyl fulgides and fulgimides.

In one aspect, a photochromic dye, as disclosed herein can have at least two photo-reactive groups coupled to one another, wherein a first photo-reactive group and a second photo-reactive group are independently at least one structure selected from the group consisting of Formula I and II:

[Formula I]

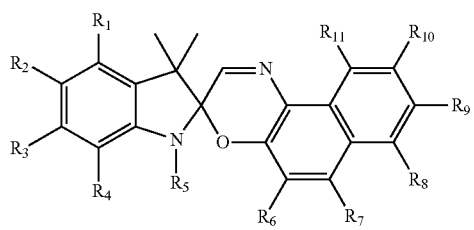

[Formula II]

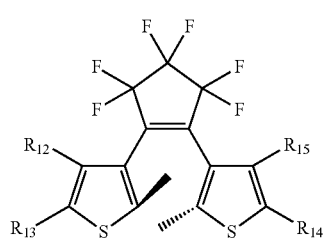

wherein $R_1$ to $R_{15}$ independently represent hydrogen, a halogen, a substituted or unsubstituted $C_{1-12}$alkyl, a substituted or unsubstituted $C_{1-12}$ alkoxy, a substituted or unsubstituted $C_{1-12}$ alkenyl, a substituted or unsubstituted $C_{1-12}$ conjugated alkyl, or a substituted or unsubstituted aryl group, a substituted or unsubstituted heteroaryl group; or the substituents together form an alkylene or alkenylene chain completing an aryl group.

In one aspect, the structures selected from the group of Formula I and Formula II are coupled to form the photochromic dye by a non-conjugated linkage. Several non-limiting examples of a non-conjugated linkage include, but are not limited to, $C_{1-12}$ alkylenes, $C_{1-12}$ heteroalkylenes, $C_{1-12}$ alkoxys, $C_{1-6}$ alkylenoxy compounds, and $C_{1-6}$ alkylenedioxy compounds, $C_{1-6}$ phenyleneoxy compounds, and $C_{1-6}$ phenylenedioxy compounds. It can be desirable to limit the length of the non-conjugated linkage because the photochromic reactions can be inhibited if the photochromic groups are able to self-associate intramolecularly can be self-associated so that the photochromic reaction can be inhibited.

"Alkylene" refers to a linear or branched saturated divalent hydrocarbon radical. Examples of the alkylene group include, without limitation, methylene, ethylene, propylene, butylenes, and the like.

"Heteroalkylene" refers to an alkylene chain as described above, in which one or more C-atoms have in each case been replaced by a heteroatom mutually independently selected from the group comprising oxygen, sulfur and nitrogen (NH). Heteroalkylene groups can have 1, 2 or 3 heteroatom(s), particularly one heteroatom, selected from the group comprising oxygen, sulfur and nitrogen (NH) as the chain member(s). Heteroalkylene groups can be 2- to 12-membered, particularly 2- to 6-membered, and more particularly 2- or 3-membered.

"Alkyleneoxy" refers to a divalent group represented by the formula -(alkylene)-O— and includes, for example, a methyleneoxy, an ethyleneoxy, a propyleneoxy, a dimethyleneoxy, and the like.

"Alkylenedioxy" refers to a divalent group represented by the formula —O-(alkylene)-O— and includes, for example, a methylenedioxy, an ethylenedioxy, a propylenedioxy, a dimethylenedioxy, and the like.

Unless otherwise indicated, this disclosure uses definitions provided below.

"Substituted" groups are those in which one or more hydrogen atoms have been replaced with one or more non-hydrogen groups, provided that valence requirements are met and that a chemically stable compound results from the substitution.

"Alkyl" refers to straight chain and branched saturated hydrocarbon groups, generally having a specified number of carbon atoms (i.e., $C_{1-6}$ alkyl refers to an alkyl group having 1, 2, 3, 4, 5, or 6 carbon atoms and $C_{1-12}$ alkyl refers to an alkyl group having 1, 2, 3, 4, 5, 6, 7, 8, 9, 10, 11, or 12 carbon atoms). Examples of alkyl groups include, without limitation, methyl, ethyl, n-propyl, i-propyl, n-butyl, s-butyl, i-butyl, t-butyl, pent-1-yl, pent-2-yl, pent-3-yl, 3-methylbut-1-yl, 3-methylbut-2-yl, 2-methylbut-2-yl, 2,2,2-trimethyleth-1-yl, n-hexyl, and the like.

"Alkoxy" refers to alkyl-O—, alkenyl-O, and alkynyl-O. Examples of alkoxy groups include, without limitation, methoxy, ethoxy, n-propoxy, i-propoxy, n-butoxy, s-butoxy, t-butoxy, n-pentoxy, s-pentoxy, and the like.

"Alkenyl" refers to straight chain and branched hydrocarbon groups having one or more unsaturated carbon-carbon bonds, and generally having a specified number of carbon atoms. Examples of alkenyl groups include, without limitation, ethenyl, 1-propen-1-yl, 1-propen-2-yl, 2-propen-1-yl, 1-buten-1-yl, 1-buten-2-yl, 3-buten-1-yl, 3-buten-2-yl, 2-buten-1-yl, 2-buten-2-yl, 2-methyl-1-propen-1-yl, 2-methyl-2-propen-1-yl, 1,3-butadien-1-yl, 1,3-butadien-2-yl, and the like.

"Aryl" refers to monovalent and divalent aromatic groups, respectively, including 5- and 6-membered monocyclic aromatic groups that contain 0 to 4 heteroatoms independently selected from nitrogen, oxygen, and sulfur. Examples of monocyclic aryl groups include, without limitation, phenyl, pyrrolyl, furanyl, thiophenyl, thiazolyl, isothiazolyl, imidazolyl, triazolyl, tetrazolyl, pyrazolyl, oxazolyl, isooxazolyl, pyridinyl, pyrazinyl, pyridazinyl, pyrimidinyl, and the like. The aryl group also includes bicyclic groups, tricyclic groups, etc., including fused 5- and 6-membered rings described above. Examples of multicyclic aryl groups include, without limitation, naphthyl, biphenyl, anthracenyl, pyrenyl, carbazolyl, benzoxazolyl, benzodioxazolyl, benzothiazolyl, benzoimidazolyl, benzothiopheneyl, quinolinyl, isoquinolinyl, indolyl, benzofuranyl, purinyl, indolizinyl, and the like. The aryl and arylene groups may be attached to a parent group or to a substrate at any ring atom, unless such attachment would violate valence requirements. Likewise, the aryl group may include one or more non-hydrogen substituents unless such substitution would violate valence requirements. Useful substituents include, without limitation, alkyl, alkenyl, alkynyl, haloalkyl, haloalkenyl, haloalkynyl, cycloalkyl, cycloalkenyl, alkoxy, cycloalkoxy, alkanoyl, cycloalkanoyl, cycloalkenoyl, alkoxycarbonyl, cycloalkoxycarbonyl, and halo, as defined above, and hydroxy, mercapto, nitro, amino, and alkylamino.

In one non-limiting embodiment, $R_2$ and $R_9$ of Formula I independently represent hydrogen, a substituted or unsubstituted aryl group, or a substituted or unsubstituted heteroaryl group; or $R_2$ and $R_3$, or $R_9$ and $R_{10}$ together form an alkylene or alkenylene chain completing an aryl group.

In one non-limiting embodiment, said $R_2$ and $R_9$ independently represent hydrogen or a phenyl; or $R_2$ and $R_3$, or $R_9$ and $R_{10}$ together form a benzene or naphthyl.

In one non-limiting embodiment, the photochromic group of Formula I may be selected from the group consisting of the following Formula I-1 to I-9:

[Formula I-1]

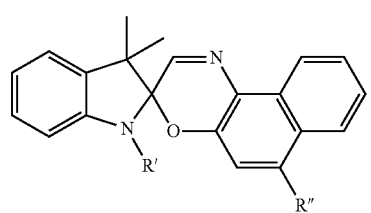

[Formula I-2]

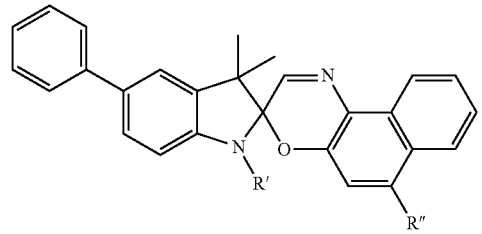

[Formula I-3]

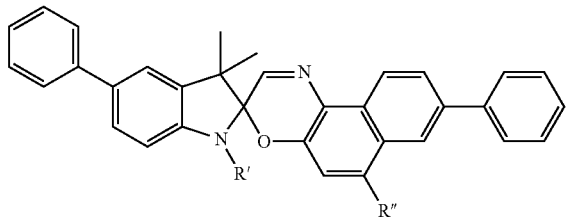

[Formula I-4]

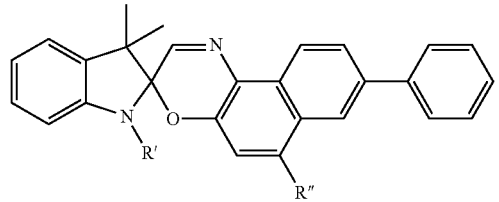

[Formula I-5]

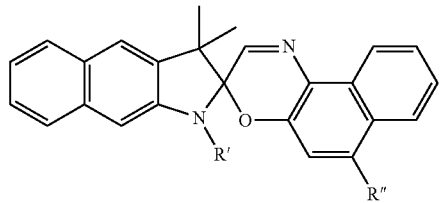

[Formula I-6]

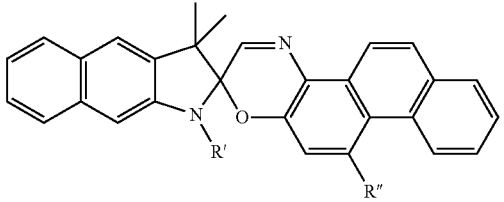

[Formula I-7]

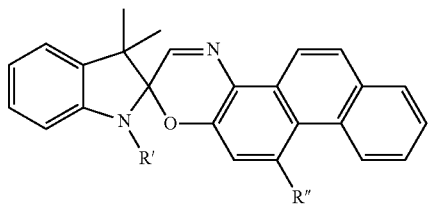

[Formula I-8]

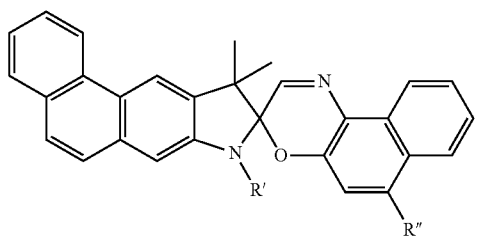

[Formula I-9]

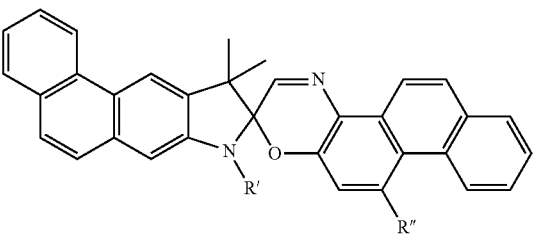

wherein R' and R" independently represent hydrogen, a halogen, a substituted or unsubstituted $C_{1-6}$ alkyl, or a substituted or unsubstituted $C_{1-6}$ alkoxy.

In one non-limiting embodiment, $R_{13}$ and $R_{14}$ of Formula II independently represent hydrogen; and $R_{12}$ and $R_{15}$ independently represent hydrogen, a substituted or unsubstituted $C_{6-12}$ conjugated alkyl, a substituted or unsubstituted aryl group, or a substituted or unsubstituted heteroaryl group.

In one non-limiting embodiment, said $R_{13}$ and $R_{14}$ independently represent hydrogen; and $R_{12}$ and $R_{15}$ independently represent hydrogen, a phenyl or a substituted or unsubstituted dithienothiophenyl.

In one non-limiting embodiment, the photochromic group of Formula II is selected from the group consisting of Formula II-1 to II-6:

[Formula II-1]

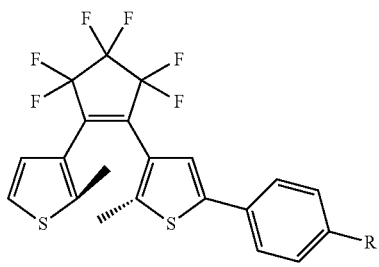

[Formula II-2]

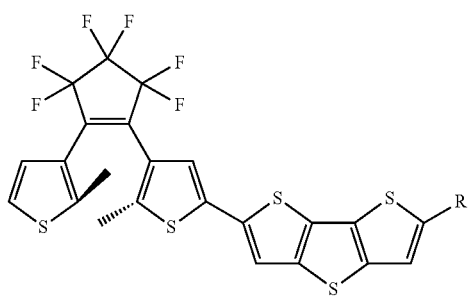

[Formula II-3]

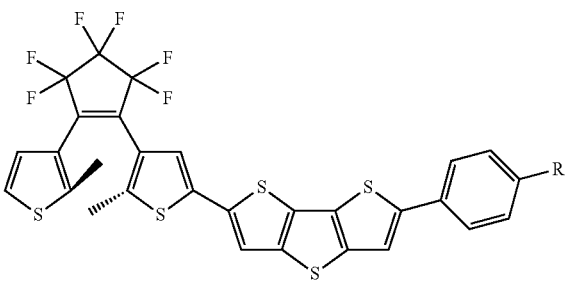

[Formula II-4]

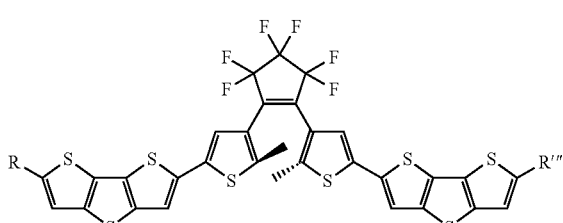

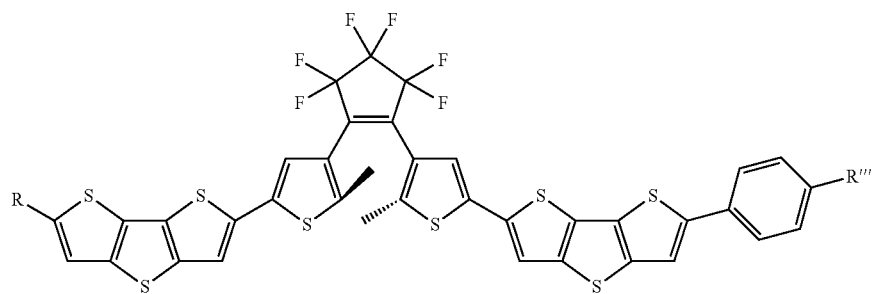

[Formula II-5]

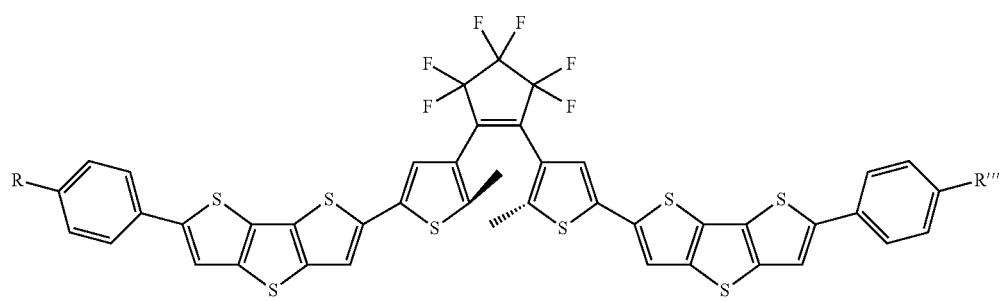

[Formula II-6]

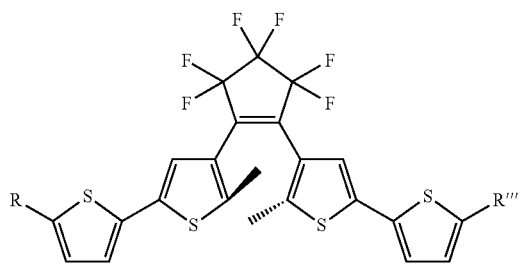

[Formula II-7]

Wherein, R and R''' independently represent hydrogen, or a substituted or unsubstituted $C_{1-12}$ alkyl.

III. Articles Incorporating Photochromic Dyes

This disclosure also provides a photochromic composition. The photochromic composition can include one or more of the photochromic dyes described previously herein, with the dye (or dyes) being incorporated into a portion of a first material. In illustrative embodiments, the first material may include, but is not limited to, a polymer, a biopolymer such as DNA/RNA or protein, an oligomer, a monomer or a mixture or combination thereof.

The photochromic dye may be incorporated into a portion of a material, such as a polymer, oligomer or monomer to form a photochromic composition, which may be used, for example and without limitation, to form photochromic articles. As used herein the term "polymer" refers to homopolymers and copolymers as well as blends and other combinations thereof. As used herein the term "oligomer" refers to homo-oligomers and co-oligomers as well as blends and other combinations of two or more monomer units that are capable of reacting with additional monomer units. As used herein the term "incorporated into" means physically and/or chemically combined with. For example, the photochromic dyes according to various non-limiting examples disclosed herein may be physically associated with a portion of an material, for example and without limitation, by mixing, combining, impregnating, inserting, or imbibing the photochromic dye into the material; and/or chemically combined with a portion of a material, for example and without limitation, by copolymerization or otherwise covalently or non-covalently bonding the photochromic dye to the material.

According to various non-limiting embodiments disclosed herein, the photochromic dye may be incorporated into a portion of the material by at least one of blending and bonding the photochromic dye with the material. As used herein with reference to the incorporation of photochromic dyes into a material, the terms "blending" and "blended" mean that the photochromic dye is intermixed or intermingled with a portion of the material, but not bonded to the material. Further, as used herein with reference to the incorporation of photochromic dyes into a material, the terms "bonding" or "bonded" mean that the photochromic dye is linked to a portion of the material. For example, although not limiting herein, the photochromic dye may be linked to the material through a reactive substituent.

According to one embodiment, the photochromic dye may be incorporated into a portion of a material at a rate from about 0.01 wt % to about 50 wt %, or about 0.1 wt % to about 45 wt %, or about 1 wt % to about 40 wt %, or about 2 wt % to about 35 wt %, or about 5 wt % to about 30 wt %, or about 10 wt % to about 20 wt %, or about 12 wt % to about 17 wt %, or about 15 wt %.

According to one specific non-limiting embodiment, the material may be a polymeric material at least one selected from the group consisting of polyacrylates, polymethacrylates, poly(C1-C12) alkyl methacrylates, polyoxy(alkylene methacrylates), poly (alkoxylated phenol methacrylates), cellulose acetate, cellulose triacetate, cellulose acetate propionate, cellulose acetate butyrate, poly(vinyl acetate), poly (vinyl alcohol), poly(vinyl chloride), poly(vinylidene chloride), poly(vinylpyrrolidone), poly((meth)acrylamide), poly (dimethyl acrylamide), poly(hydroxyethyl methacrylate), poly((meth)acrylic acid), thermoplastic polycarbonates, polyesters, polyurethanes, polythiourethanes, poly(ethylene terephthalate), polystyrene, poly(alpha methylstyrene), copoly(styrene-methylmethacrylate), copoly(styrene-acrylonitrile), polyvinylbutyral and polymers of members of the group consisting of polyol(allyl carbonate)monomers, mono-functional acrylate monomers, mono-functional methacrylate monomers, polyfunctional acrylate monomers, polyfunctional methacrylate monomers, diethylene glycol dimethacrylate monomers, diisopropenyl benzene monomers, alkoxylated polyhydric alcohol monomers and diallylidene pentaerythritol monomers.

In general, glass transition temperature ($T_g$) refers to the temperature at which a polymer or another material transitions from a rigid, solid state to a pliable state. For example, polymers having glass transition temperatures well below room temperature can be characterized as elastomers and/or viscous liquids, whereas polymers having glass transition temperatures well above room temperature can be characterized as rigid, structural polymers.

Because the transition of photochromic dyes from one state to another generally involves one or more structural rearrangements, the switching speed of photochromic dyes can be sensitive to the rigidity of the environment around the dye. As a result, photochromic dyes switch most rapidly in solution and slowest in the rigid environment like in rigid polymer. One way that switching speeds can be increased is to incorporate the dyes into a low $T_g$ polymer (e.g., a polymer having a glass transition temperature well below room temperature). The low $T_g$ polymer can then be incorporated into a rigid material for structure while preserving the reduced switching speed afforded by the non-rigid material. Attaching flexible, low $T_g$ polymers to photochromic dyes can allow them to switch much more rapidly in a rigid matrix. For example, some spirooxazines with siloxane polymers attached can switch at near solution-like speeds even though they are incorporated into a rigid matrix.

As such, in one embodiment, the dye can be incorporated into at least one material having a glass transition temperature less than about 0° C., or less than about −5° C., or less than about −10° C., or less than about −15° C., or less than about −20° C., or less than about −25° C., or less than about −30° C., or less than about −35° C., or less than about −40° C., or less than about −45° C., or less than about −50° C., or less than about −55° C., or less than about −60° C.

In another embodiment, the dye can be incorporated into a second material, which can then be incorporated into the first material discussed above, where the second material has a glass transition temperature less than about 0° C., or less than about −5° C., or less than about −10° C., or less than about −15° C., or less than about −20° C., or less than about −25° C., or less than about −30° C., or less than about −35° C., or less than about −40° C., or less than about −45° C., or less than about −50° C., or less than about −55° C., or less than about −60° C.

In yet another embodiment, photochromic dye can be incorporated into a second material selected from the group consisting of a polysiloxane and/or a polyacrylate having a glass transition temperature less than about 0° C., or less than about −5° C., or less than about −10° C., or less than about −15° C., or less than about −20° C., or less than about −25° C., or less than about −30° C., or less than about −35° C., or less than about −40° C., or less than about −45° C., or less than about −50° C., or less than about −55° C., or less than about −60° C. As discussed above, the second material including the dye can be incorporated into the first material.

A non-limiting example of a polyacrylate having a glass transition temperature less than about 0° C. is poly(butyl acrylate), which has a glass transition temperature of −49° C. Polymerized siloxanes with organic side chains (R≠H) are commonly known as silicones or as polysiloxanes. Representative examples include, but are not limited to, $[SiO(CH_3)_2]_n$ (polydimethylsiloxane) ("PDMS") and $[SiO(C_6H_5)_2]_n$ (polydiphenylsiloxane). These compounds can be viewed as a hybrid of both organic and inorganic compounds. The organic side chains confer hydrophobic properties while the —Si—O—Si—O— backbone is purely inorganic.

PDMS is a widely used silicon-based organic polymer. Its applications range from contact lenses and medical devices to elastomers. PDMS is viscoelastic, meaning that at long flow times (or high temperatures), it acts like a viscous liquid, similar to honey. However at short flow times (or low temperatures) it acts like an elastic solid, similar to rubber. Due to its unique mechanical, chemical, and optical properties, PDMS is integrated into many optical devices. PDMS is optically clear at a wide range of wavelengths. In addition, the curing time and temperature used during cross-linking (generally with methyltrichlorosilane) can determine the refractive index (RI) of the bulk. Since the polymer can be easily molded, it has been used to form lenses and waveguides. Also, the effective RI and absorption spectrum of PDMS are changed when organic compounds are physically absorbed into the polymer.

In another embodiment, the present disclosure provides an optical article that is made of and/or incorporates one or more of the photochromic dyes or compositions disclosed herein. According to one aspect, an optical article can include at least one optical article, and at least one photochromic dye incorporated into at least a portion of the optical article.

As used herein the term "optical" means pertaining to or associated with light and/or vision. The optical elements according to various non-limiting embodiments disclosed herein may include, without limitation, ophthalmic elements, display elements, windows, mirrors, and liquid crystal cell elements. As used herein the term "ophthalmic" means pertaining to or associated with the eye and vision. Non-limiting examples of ophthalmic elements include corrective and non-corrective lenses, including single vision or multi-vision lenses, which may be either segmented or non-segmented multi-vision lenses (such as, but not limited to, bifocal lenses, trifocal lenses and progressive lenses), contact lenses, as well as other elements used to correct, protect, or enhance (cosmetically or otherwise) vision, including without limitation, magnifying lenses, protective lenses, visors, goggles, as well as, lenses for optical instruments (for example, cameras and telescopes). As used herein the term "display" means the visible or machine-readable representation of information in words, numbers, symbols, designs or drawings. Non-limiting examples of display elements include screens, monitors, and security elements, such as security marks. As used herein the term "window" means an aperture adapted to permit the transmission of radiation therethrough. Non-limiting examples of windows include automotive and aircraft transparencies, windshields, filters, shutters, and optical switches. As used herein the term "mirror" means a surface that specularly reflects a large fraction of incident light. As used herein the term "liquid crystal cell" refers to a structure containing a liquid crystal material that is capable of being ordered. One non-limiting example of a liquid crystal cell element is a liquid crystal display.

In one embodiment, the photochromic dye incorporated into the optical article can include a first photo-reactive group and a second photo-reactive group. In one aspect, a first photochromic reaction can be induced in the first photo-reactive group by radiation having a first intensity, and a second photochromic reaction can be induced in the second photo-reactive group by radiation having a second intensity. Any of the other photochromic dyes described herein can be incorporated in the optical article without limitation as to composition.

In one aspect, the optical article can be fabricated from or further include at least one polymer selected from the group consisting of polyacrylates, polymethacrylates, polyalkylmethacrylates, polyoxy(alkylene methacrylates), poly(alkoxylated phenol methacrylates), cellulose acetate, cellulose triacetate, cellulose acetate propionate, cellulose acetate butyrate, poly(vinyl acetate), poly(vinyl alcohol), poly(vinyl chloride), poly(vinylidene chloride), poly(vinylpyrrolidone), poly((meth)acrylamide), poly(dimethyl acrylamide), poly(hydroxyethyl methacrylate), poly((meth)acrylic acid), thermoplastic polycarbonates, polyesters, polyurethanes, polythiourethanes, poly(ethylene terephthalate), polystyrene, poly(alpha methylstyrene), copoly(styrene-methylmethacrylate), copoly(styrene-acrylonitrile), polyvinylbutyral, and polymers of members of the group consisting of polyol(allyl carbonate)monomers, mono-functional acrylate monomers, mono-functional methacrylate monomers, polyfunctional acrylate monomers, polyfunctional methacrylate monomers, diethylene glycol dimethacrylate monomers, diisopropenyl benzene monomers, alkoxylated polyhydric alcohol monomers and diallylidene pentaerythritol monomers.

As described above, the dye incorporated in the optical article can be incorporated into at least one material having a glass transition temperature less than about 0° C. In another aspect, the dye can be incorporated into a second material, which can then be incorporated into the first material discussed above, where the second material has a glass transition temperature less than about 0° C. In yet another embodiment, photochromic dye can be incorporated into a second material selected from the group consisting of a polysiloxane and/or a polyacrylate having a glass transition temperature less than about 0° C.

Various non-limiting embodiments disclosed herein provide photochromic articles comprising a substrate and a photochromic dye according to any of the non-limiting embodiments discussed above connected to a portion of the substrate. As used herein, the term "connected to" means associated with, either directly or indirectly through another material or structure.

Non-limiting embodiments disclosed herein provide a method of preparing an optical element, comprising connecting a photochromic composition to at least a portion of a substrate by at least one of in-mold casting, coating and lamination.

For example, according to one non-limiting embodiment, the photochromic composition may be connected to at least a portion of a substrate by in-mold casting. According to this non-limiting embodiment, a coating composition comprising the photochromic composition, which may be a liquid coating composition or a powder coating composition, is applied to the surface of a mold. After that, the coated substrate is removed from the mold. Non-limiting examples of powder coatings in which the photochromic composition according to various non-limiting embodiments disclosed herein may be employed are set forth in U.S. Pat. No. 6,068,797, the disclosure of which is incorporated by reference herein in its entirety.

According to another non-limiting embodiment, the photochromic composition may be connected to a portion of a substrate by coating. Non-limiting examples of suitable coating methods include spin coating, spray coating (e.g., using a liquid or powder coating), curtain coating, roll coating, spin and spray coating, over-molding, and combinations thereof. For example, according to one non-limiting embodiment, the photochromic composition may be connected to the substrate by over-molding. According to this non-limiting embodiment, a coating composition comprising the photochromic composition (which may be a liquid coating composition or a powder coating composition as previously discussed) may be applied to a mold and then the substrate may be placed into the mold such that the substrate contacts the coating causing it to spread over the surface of the substrate. Thereafter, the coating composition may be at least partially set and the coated substrate may be removed from the mold. As used herein, the term "set" include, without limitation, curing, polymerizing, cross-linking, cooling, and drying. Alternatively, over-molding may be done by placing the substrate into a mold such that an open region is defined between the substrate and the mold, and thereafter injecting a coating composition comprising the photochromic composition into the open region. Thereafter, the coating composition may be at least partially set and the coated substrate may be removed from the mold.

Additionally or alternatively, a coating composition (with or without a photochromic composition) may be applied to a substrate (for example, by any of the foregoing methods), the coating composition may be at least partially set, and thereafter, a photochromic dye may be imbibed (as previously discussed) into the coating composition.

According to still another non-limiting embodiment, wherein the substrate comprises a polymeric material or an inorganic material such as glass, the photochromic composition may be connected to at least a portion of a substrate by lamination. According to this non-limiting embodiment, a film comprising the photochromic composition may be adhered or otherwise connect to at least a portion of the substrate, with or without an adhesive and/or the application of heat and pressure. Thereafter, if desired, a second substrate may be applied over the first substrate and the two substrates may be laminated together (i.e., by the application of heat and pressure) to form an element wherein the film comprising the photochromic composition is interposed between the two substrates. Methods of forming films comprising a photochromic composition may include, for example and without limitation, combining a photochromic composition with a polymeric solution or oligomeric solution or mixture, casting or extruding a film therefrom, and, if required, at least partially setting the film. Additionally or alternatively, a film may be formed (with or without a photochromic composition) and imbibed with the photochromic composition (as discussed above).

Further, it will be appreciated by those skilled in the art that the photochromic compositions and articles according to various non-limiting embodiments disclosed herein may further comprise other additives that aid in the processing and/or performance of the composition or article. Non-limiting examples of such additives include from photoinitiators, thermal initiators, polymerization inhibitors, solvents, light stabilizers (such as, but not limited to, ultraviolet light absorbers and light stabilizers, such as hindered amine light stabilizers (HALS)), heat stabilizers, mold release agents, rheology control agents, leveling agents (such as, but not limited to, surfactants), free radical scavengers, adhesion promoters (such as hexanediol diacrylate and coupling agents), and combinations and mixtures thereof.

This disclosure also provides a photochromic composition comprising the photochromic dye described previously herein incorporated into at least a portion of an organic material, said organic material being a polymer, an oligomer, a monomer or a mixture thereof.

The photochromic dye may be incorporated into at least a portion of an organic material, such as a polymer, oligomer or monomer to form a photochromic composition, which may be used, for example and without limitation, to form photochromic articles. As used herein the term "polymer" refers to homopolymer and copolymer as well as blends and other combinations thereof. As used herein the terms "oligomer" refer to a combination of two or more monomer units that is capable of reacting with additional monomer units. As used herein the term "incorporated into" means physically and/or chemically combined with. For example, the photochromic dyes according to various non-limiting examples disclosed herein may be physically combined with at least a portion of an organic material, for example and without limitation, by mixing or blending the photochromic dye into the organic material; and/or chemically combined with a portion of an organic material, for example and without limitation, by copolymerization or otherwise bonding the photochromic dye to the organic material.

According to various non-limiting embodiment disclosed herein, the photochromic dye may be incorporated into at least a portion of the organic material by at least one of blending and bonding the photochromic dye with the organic material. As used herein with reference to the incorporation of photochromic dyes into an organic material, the terms "blending" and "blended" mean that the photochromic dye is intermixed or intermingled with a portion of the organic material, but not bonded to the organic material. Further, as used herein with reference to the incorporation of photochromic dyes into an organic material, the terms "bonding" or "bonded" mean that the photochromic dye is linked to a portion of the organic material. For example, although not limiting herein, the photochromic dye may be linked to the organic material through a reactive substituent.

According to one specific non-limiting embodiment, the organic material may be a polymer at least one selected from the group consisting of polyacrylates, polymethacrylates, polyalkylmethacrylates, polyoxy(alkylene methacrylates), poly (alkoxylated phenol methacrylates), cellulose acetate, cellulose triacetate, cellulose acetate propionate, cellulose acetate butyrate, poly(vinyl acetate), poly(vinyl alcohol), poly(vinyl chloride), poly(vinylidene chloride), poly(vinylpyrrolidone), poly((meth)acrylamide), poly(dimethyl acrylamide), poly(hydroxyethyl methacrylate), poly((meth) acrylic acid), thermoplastic polycarbonates, polyesters, polyurethanes, polythiourethanes, poly(ethylene terephthalate), polystyrene, poly(alpha methylstyrene), copoly(styrene-methylmethacrylate), copoly(styrene-acrylonitrile), polyvinylbutyral and polymers of members of the group consisting of polyol(allyl carbonate)monomers, mono-functional acrylate monomers, mono-functional methacrylate monomers, polyfunctional acrylate monomers, polyfunctional methacrylate monomers, diethylene glycol dimethacrylate monomers, diisopropenyl benzene monomers, alkoxylated polyhydric alcohol monomers and diallylidene pentaerythritol monomers.

In another embodiment, the present disclosure provides an optical article applying the photochromic composition according to this disclosure. As used herein the term "optical" means pertaining to or associated with light and/or vision. The optical elements according to various non-limiting embodiments disclosed herein may include, without limitation, ophthalmic elements, display elements, windows, mirrors, and liquid crystal cell elements. As used herein the term "ophthalmic" means pertaining to or associated with the eye and vision. Non-limiting examples of ophthalmic elements include corrective and non-corrective lenses, including single vision or multi-vision lenses, which may be either segmented or non-segmented multi-vision lenses (such as, but not limited to, bifocal lenses, trifocal lenses and progressive lenses), as well as other elements used to correct, protect, or enhance (cosmetically or otherwise) vision, including without limitation, magnifying lenses, protective lenses, visors, goggles, as well as, lenses for optical instruments (for example, cameras and telescopes). As used herein the term "display" means the visible or machine-readable representation of information in words, numbers, symbols, designs or drawings. Non-limiting examples of display elements include screens, monitors, and security elements, such as security marks. As used herein the term "window" means an aperture adapted to permit the transmission of radiation therethrough. Non-limiting examples of windows include automotive and aircraft transparencies, windshields, filters, shutters, and optical switches. As used herein the term "mirror" means a surface that specularly reflects a large fraction of incident light. As used herein the term "liquid crystal cell" refers to a structure containing a liquid crystal material that is capable of being ordered. One non-limiting example of a liquid crystal cell element is a liquid crystal display.

Various non-limiting embodiments disclosed herein provide photochromic articles comprising a substrate and a photochromic composition according to any of the non-limiting embodiments discussed above connected to at least a portion of the substrate. As used herein, the term "connected to" means associated with, either directly or indirectly through another material or structure.

Non-limiting embodiments disclosed herein provide a method of preparing an optical element, comprising connecting a photochromic composition to at least a portion of a substrate by at least one of in-mold casting, coating and lamination.

For example, according to one non-limiting embodiment, the photochromic composition may be connected to at least a portion of a substrate by in-mold casting. According to this non-limiting embodiment, a coating composition comprising the photochromic composition, which may be a liquid coating composition or a powder coating composition, is applied to the surface of a mold. After that, the coated substrate is removed from the mold. Non-limiting examples of powder coatings in which the photochromic composition according to various non-limiting embodiments disclosed herein may be employed are set forth in U.S. Pat. No. 6,068,797 at col. 7, line 50 to col. 19, line 42, which disclosure is hereby specifically incorporated by reference herein.

According to another non-limiting embodiment, the photochromic composition may be connected to a portion of a substrate by coating. Non-limiting examples of suitable coating methods include spin coating, spray coating (e.g., using a liquid or powder coating), curtain coating, roll coating, spin and spray coating, over-molding, and combinations thereof. For example, according to one non-limiting embodiment, the photochromic composition may be connected to the substrate by over-molding. According to this non-limiting embodiment, a coating composition comprising the photochromic composition (which may be a liquid coating composition or a powder coating composition as previously discussed) may be applied to a mold and then the substrate may be placed into the mold such that the substrate contacts the coating causing it to spread over the surface of the substrate. Thereafter, the coating composition may be at least partially set and the coated substrate may be removed from the mold. As used herein, the term "set" include, without limitation, curing, polymerizing, cross-linking, cooling, and drying. Alternatively, over-molding may be done by placing the substrate into a mold such that an open region is defined between the substrate and the mold, and thereafter injecting a coating composition comprising the photochromic composition into the open region. Thereafter, the coating composition may be at least partially set and the coated substrate may be removed from the mold.

Additionally or alternatively, a coating composition (with or without a photochromic composition) may be applied to a substrate (for example, by any of the foregoing methods), the coating composition may be at least partially set, and thereafter, a photochromic dye may be imbibed (as previously discussed) into the coating composition.

According to still another non-limiting embodiment, wherein the substrate comprises a polymeric material or an inorganic material such as glass, the photochromic composition may be connected to at least a portion of a substrate by lamination. According to this non-limiting embodiment, a film comprising the photochromic composition may be adhered or otherwise connect to at least a portion of the substrate, with or without an adhesive and/or the application of heat and pressure. Thereafter, if desired, a second substrate may be applied over the first substrate and the two substrates may be laminated together (i.e., by the application of heat and pressure) to form an element wherein the film comprising the photochromic composition is interposed between the two substrates. Methods of forming films comprising a photochromic composition may include, for example and without limitation, combining a photochromic composition with a polymeric solution or oligomeric solution or mixture, casting or extruding a film therefrom, and, if required, at least partially setting the film. Additionally or alternatively, a film may be formed (with or without a photochromic composition) and imbibed with the photochromic composition (as discussed above).

Further, it will be appreciated by those skilled in the art that the photochromic compositions and articles according to various non-limiting embodiments disclosed herein may further comprise other additives that aid in the processing and/or performance of the composition or article. Non-limiting examples of such additives include from photoinitiators, thermal initiators, polymerization inhibitors, solvents, light stabilizers (such as, but not limited to, ultraviolet light absorbers and light stabilizers, such as hindered amine light stabilizers (HALS)), heat stabilizers, mold release agents, rheology control agents, leveling agents (such as, but not limited to, surfactants), free radical scavengers, adhesion promoters (such as hexanediol diacrylate and coupling agents), and combinations and mixtures thereof.

The present disclosure is not to be limited in terms of the particular examples described in this application. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular examples only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof.

Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into sub-ranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

EXAMPLES

The synthesis procedures used to make photochromic dyes according to various non-limiting embodiments disclosed herein are set forth in Examples 1 to 3.

Example 1

The synthesis of 1,3,3-trimethyl-6-(2-(1',3',3'-trimethylspiro[benzo[b][1,4]oxazine-2,2'-indoline]-6-yloxy)ethoxy)spiro[indoline-2,3'-naphtho[2,1-b][1,4]oxazine]

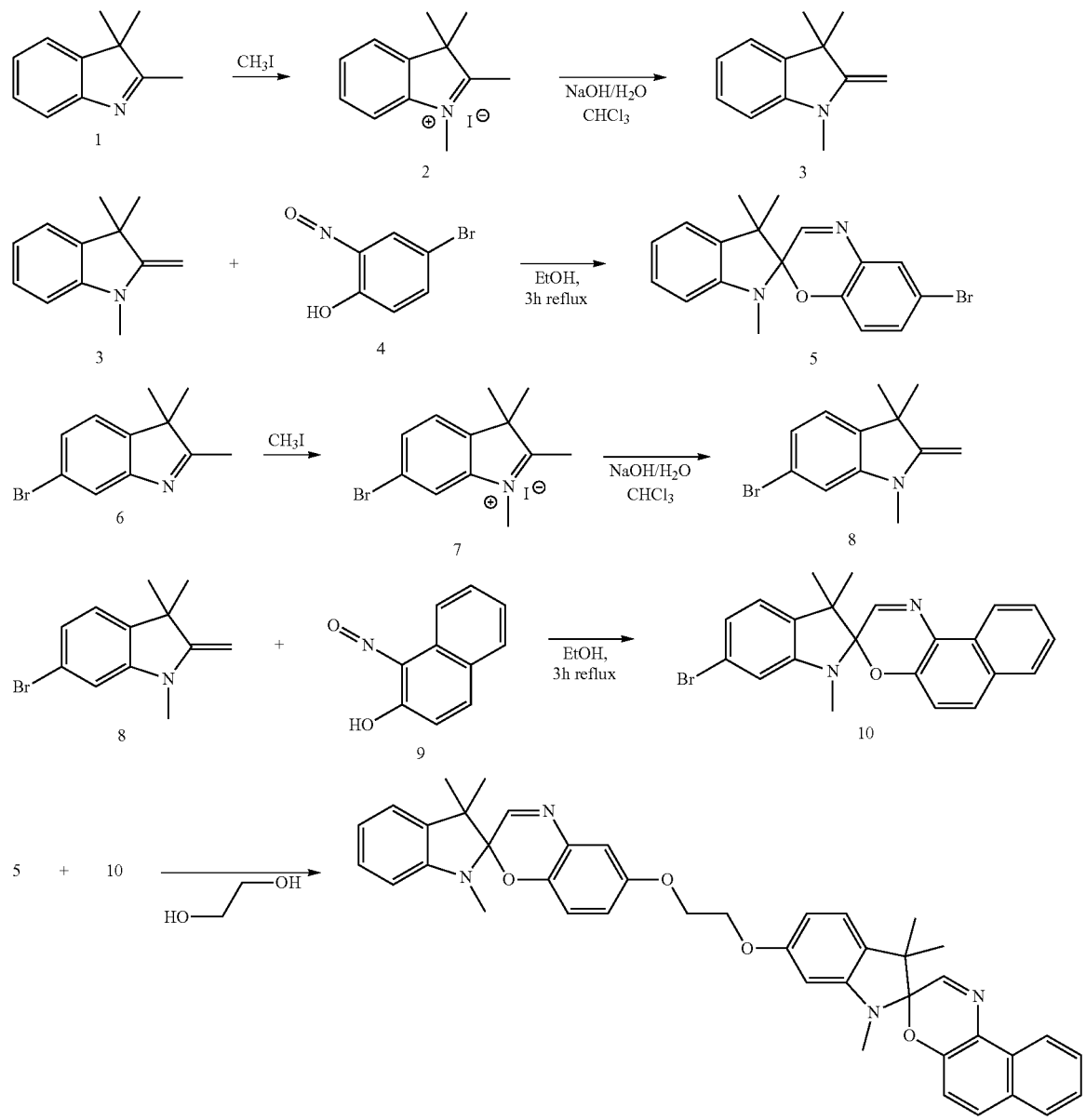

Preparation of compound 2: A solution of 2,3,3-trimethyl-3H-indole and iodomethane in dichloroethane is refluxed by stirring for 4 h. Then the reaction mixture is stirred for one hour at room temperature and the precipitated solid is collected by filtration.

Preparation of compound 3: After the crude solid of compound 2 is washed with acetone, a portion of the solid is dissolved in NaOH aqueous solution (1 M). The resultant 1,3,3-trimethyl-2-methyleneindoline is extracted with chloroform. The organic layer is dried with anhydrous $Na_2SO_4$ and the solvent was evaporated.

Preparation of compound 5: Compound 3 and 4-bromo2-nitrosophenol are dissolved in ethanol and the mixture is stirred at 90° C. for 3 h. After cooling the mixture, the solid product, 5 is obtained by filtration.

Preparation of compound 7: A solution of 6-bromo-2,3,3-trimethyl-3H-indole and iodomethane in dichloroethane is refluxed by stirring for 6 h. Then the reaction mixture is stirred for one hour at room temperature and the precipitated solid, 7 is collected by filtration.

Preparation of compound 8: After the solid of compound 7 is washed with acetone, a portion of the solid is dissolved in NaOH aqueous solution (1 M). The resultant 6-bromo-1,3,3-trimethyl-2-methyleneindoline, 8 is extracted with chloroform. The organic layer is dried with anhydrous $Na_2SO_4$ and the solvent is evaporated. The product is obtained in a fairly high yield.

Preparation of compound 10: compound 8 and 1-nitrosonaphtalen-2-ol are dissolved in ethanol and the mixture is stirred at 90° C. for 3 h. After cooling the mixture, the solid product, 6-bromo-1,3,3-trimethylspiro[indoline-2,3'-naphtho[2,1-b][1,4]oxazine] is obtained by filtration.

Preparation of compound 11: Compound 5 and 10 are dissolved in toluene with the presence of 1,2-ethanediol and HCl (0.1M solution) and the mixture is refluxed for 12 hrs. The final compound 1,3,3-trimethyl-6-(2-(1',3',3'-trimethyl-spiro[benzo[b][1,4]oxazine-2,2'-indoline]-6-yloxy)ethoxy) spiro[indoline-2,3'-naphtho[2,1-b][1,4]oxazine] is obtained by silical gel chromatography (EA:hexane=1:4). The resultant compound is purified by reprecipitation in THF/ether.

Example 2

The synthesis of 1,3,3-trimethyl-6-(4-((1',3',3'-trimethylspiro[benzo[b][1,4]oxazine-2,2'-indoline]-6-yloxy)methyl)benzyloxy)spiro[indoline-2,3'-naphtho[2,1-b][1,4]oxazine]

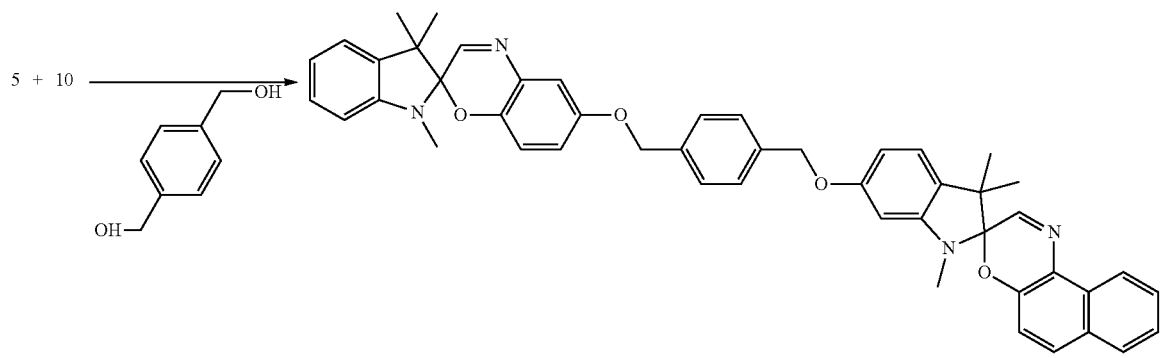

The synthesis of compound 12 is quite similar to that of compound.

Compound 5 and 10 are dissolved in dimethylformamide with the presence of 1,4-phenylenedimethanol. The reaction mixture is refluxed for overnight. The final compound, 1,3,3-trimethyl-6-(4-((1',3',3'-trimethylspiro[benzo[b][1,4]ox-azine-2,2'-indoline]-6-yloxy)methyl)benzyloxy)spiro[indo-line-2,3'-naphtho[2,1-b][1,4]oxazine] is obtained by silical gel chromatography (EA:hexane=1:4). The resultant compound is purified by reprecipitation in THF/hexane.

Example 3

The synthesis of a photochromic dye according to the scheme III-1.

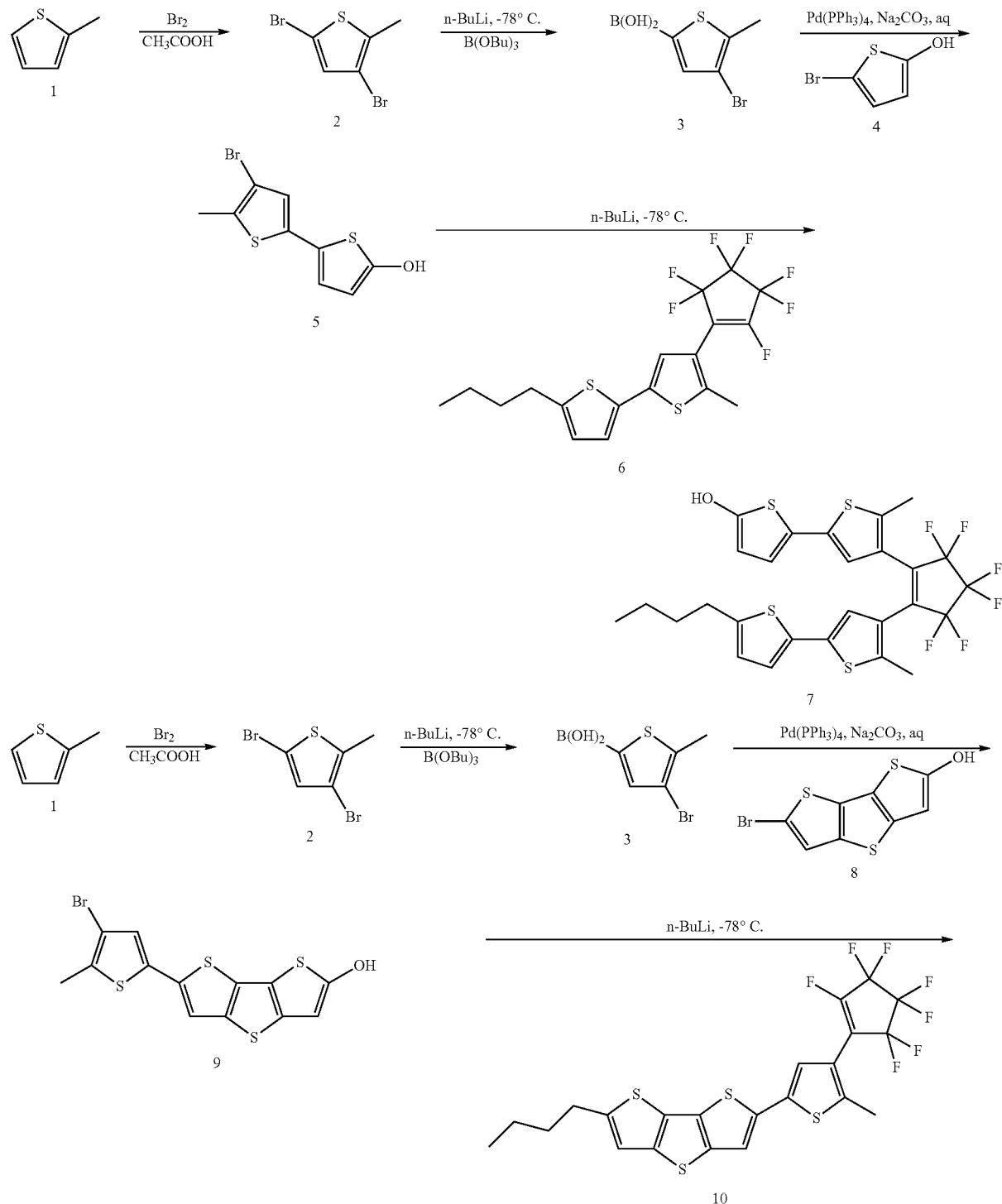

-continued

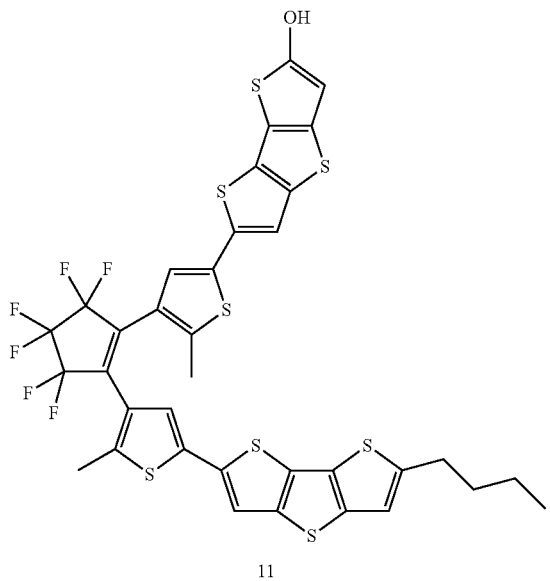

11

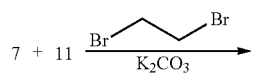

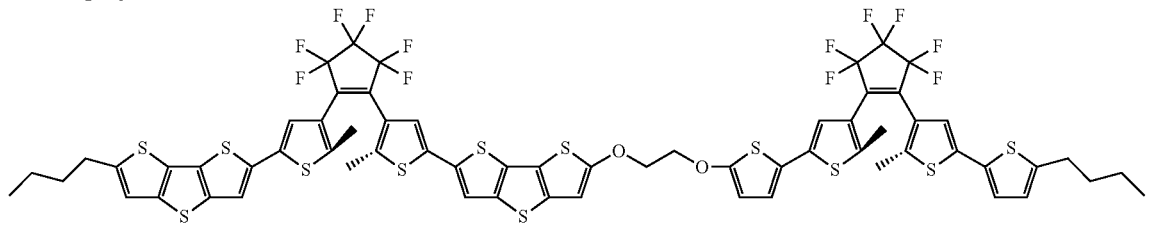

12

Synthesis of 3,5-dibromo-2-methylthiophene 2: Bromine in acetic acid is slowly added to a stirred solution of 2-methylthiophene in acetic acid (100 mL) at 0° C. The reaction mixture is stirred overnight at this temperature. The reaction is quenched by the addition of water 30 mL. The mixture is neutralized to pH 9.0 with Na2CO3 solid and extracted with ether. The ether extract is dried, filtrated, and concentrated. The residue is purified by distillation in vacuo. Compound 5 is obtained as a colorless oil B.p. 100° C.

Synthesis of 3-bromo-2-methyl-5-thienylboronic acid 3: n-Butyl lithium in hexane is added to a stirred solution of compound 2 in dry ether (150 mL) at −78° C. under argon atmosphere. After stirring for 30 min, boric acid tri-butyl ester is quickly added to the reaction mixture. The mixture is extracted with 4% aq. NaOH (100 mL), the extract is collected and neutralized by with 10% HCl. The solid residue is washed, filtrated, and dried. Compound 3 is obtained as a yellowish solid. M.p. 229° C.

Synthesis of 3-bromo-2-methyl-5-(4-hydroxythienyl) thiophene 5: Compound 3 is mixed with 5-bromothiophen-2-ol in the presence of tetrakis(triphenylphosphine)palladium(0) [Pd(PPh3)4] and Na$_2$CO$_3$ in tetrahydrofuran (THF) for 24 h at 80° C. The crude product is distillated in vacuo and purified by silica-gel column chromatography (eluent:hexane). Compound 5 (5.01 g) is obtained as a yellowish solid.

Synthesis of compound 9: The synthesis is quite similar to that for compound 5. Instead of compound 4, compound 4 is employed in the coupling reaction.

Synthesis of 4'-(2-(5'-butyl-5-methyl-2,2'-bithiophen-4-yl)-3,3,4,4,5,5-hexafluoro cyclopent-1-enyl)-5'-methyl-2,2'-bithiophen-5-ol 7: Compound 5 in anhydrous THF is added dropwise to a 2.4 mol/L n-BuLi hexane solution at −78° C. under an argon atmosphere. The mixture is kept stirring for 1 hr and 5'-butyl-5-methyl-4-(perfluorocyclopent-1-enyl)-2,2'-bithiophene, 6 is slowly added to the reaction mixture at −78° C. and stirred for 4 h. The reaction is quenched with 50 mL water. The mixture is warmed to room temperature and extracted with ether. The organic layer is dried over MgSO$_4$, filtrated and evaporated. The crude product is purified by column chromatography on silica gel using hexane as the eluent.

Synthesis of compound 11: The synthesis is quite similar to that for compound 5. Instead of compound 6, compound 11 is employed in the coupling reaction.

Synthesis of compound 12: Compound 7 and 11 are mixed in THF at room temperature in the presence of dibromoethane and potassium carbonate. The reaction mixture is allowed to be refluxed overnight. The crude product is neutralized and filtered. The filtrate is purified by silical gel column chromatography.

What is claimed is:

1. A stable photochromic dye, comprising: at least two photo-reactive groups including: a first photo-reactive group configured to undergo a first reversible photochromic reaction in response to radiation having a first wavelength; a second photo-reactive group configured to undergo a second reversible photochromic reaction in response to radiation having a second wavelength;

wherein, the at least two photo-reactive groups are coupled to one another by a non-conjugated linkage selected from the group consisting of $C_{1-12}$ alkylene, $C_{1-12}$ heteroalkylene, $C_{1-12}$ alkoxy, $C_{1-6}$ alkylenoxy, $C_{1-6}$ alkylenedioxy, $C_{1-6}$ phenyleneoxy, and $C_{1-12}$ phenylenedioxy;

wherein, the first photo-reactive group and second photo-reactive group are independently at least one structure selected from the group consisting of Formula I and II:

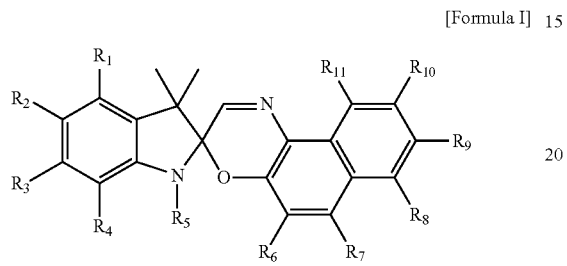

[Formula I]

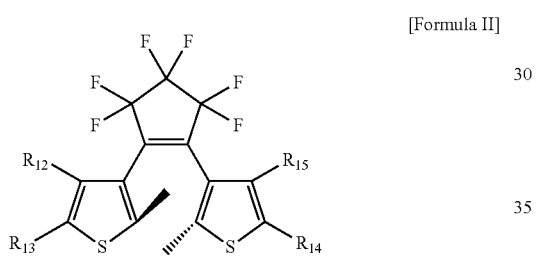

[Formula II]

wherein, $R_1$ to $R_{15}$ independently represent hydrogen, a halogen, a substituted or unsubstituted $C_{1-12}$ alkyl, a substituted or unsubstituted $C_{1-12}$ alkoxy, a substituted or unsubstituted $C_{1-12}$ alkenyl, a substituted or unsubstituted $C_{1-12}$ conjugated alkyl, a substituted or unsubstituted aryl group, or a substituted or unsubstituted heteroaryl group or the substituents together form an alkylene or alkenylene chain completing an aryl group.

2. The photochromic dye of claim 1, wherein:
the first photochromic reaction includes modification of a first conjugation system in the first photo-reactive group; and
the second photochromic reaction includes modification of a second conjugation system in the second photo-reactive group.

3. The photochromic dye of claim 1, wherein the first photo-reactive group and the second photo-reactive group have different respective absorption maxima.

4. The photochromic dye of claim 3, wherein a difference of absorption maxima between the first photo-reactive group and the second photo-reactive group photochromic is greater than or equal to about 50 nm.

5. A stable photochromic dye, comprising: at least two photo-reactive groups including: a first photo-reactive group including a first conjugation system reversibly formed in response to radiation having a first wavelength, the first conjugation system exhibiting a first conjugation bond length; and a second photo-reactive group including a second conjugation system reversibly formed in response to radiation having a second wavelength, the second conjugation system exhibiting a second conjugation bond length that is longer than the first conjugation bond length;

wherein, the at least two photo-reactive groups are coupled to one another by a non-conjugated linkage selected from the group consisting of $C_{1-12}$ alkylene, $C_{1-12}$ heteroalkylene, $C_{1-12}$ alkoxy, $C_{1-6}$ alkylenoxy, $C_{1-6}$ alkylenedioxy, $C_{1-6}$ phenyleneoxy, and $C_{1-12}$ phenylenedioxy;

wherein, the first photo-reactive group and second photo-reactive group are independently at least one structure selected from the group consisting of Formula I and II:

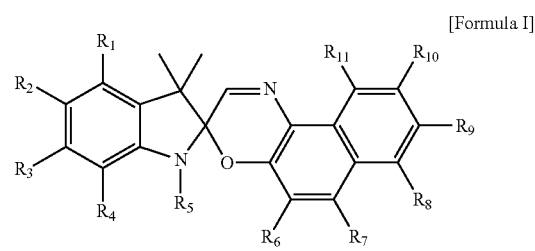

[Formula I]

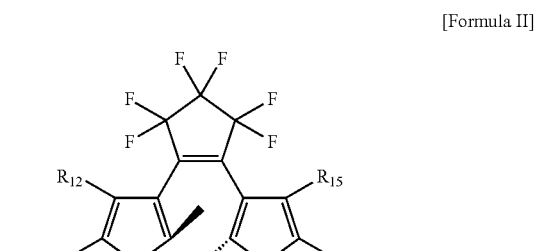

[Formula II]

wherein, $R_1$ to $R_{15}$ independently represent hydrogen, a halogen, a substituted or unsubstituted $C_{1-12}$ alkyl, a substituted or unsubstituted $C_{1-12}$ alkoxy, a substituted or unsubstituted $C_{1-12}$ alkenyl, a substituted or unsubstituted $C_{1-12}$ conjugated alkyl, a substituted or unsubstituted aryl group, or a substituted or unsubstituted heteroaryl group or the substituents together form an alkylene or alkenylene chain completing an aryl group.

6. The photochromic dye of claim 5, wherein the first photo-reactive group and the second photo-reactive group exhibit different respective absorption maxima.

7. The photochromic dye of claim 5, wherein the first photo-reactive group exhibits an absorption maximum of about 250 nm to about 350 nm, and the second photo-reactive group exhibits an absorption maximum of about 400 nm to about 500 nm.

8. A stable photochromic composition, comprising: at least one material selected from the group consisting of a polymer, an oligomer, and a monomer; and at least one photochromic dye incorporated into at least a portion of the at least one material, the at least one photochromic dye having at least two photo-reactive groups that are coupled to one another, wherein the at least one photochromic dye includes: a first photo-reactive group configured to undergo a first reversible photochromic reaction in response to radiation having a first wavelength; and a second photo-reactive group configured to undergo a second reversible photochromic reaction in response to radiation having a second wavelength;

wherein, the at least two photo-reactive groups are coupled to one another by a non-conjugated linkage selected from the group consisting of $C_{1-12}$ alkylene, $C_{1-12}$ heteroalkylene, $C_{1-12}$ alkoxy, $C_{1-6}$ alkylenoxy, $C_{1-6}$ alkylenedioxy, $C_{1-6}$ phenyleneoxy, and $C_{1-12}$ phenylenedioxy;

wherein, the first photo-reactive group and second photo-reactive group are independently at least one structure selected from the group consisting of Formula I and II:

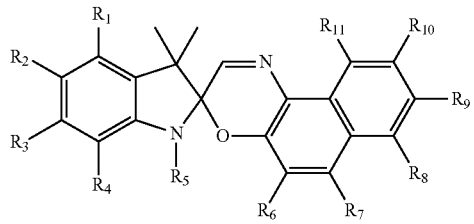

[Formula I]

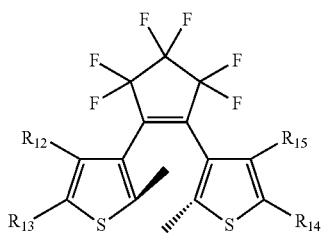

[Formula II]

wherein, $R_1$ to $R_{15}$ independently represent hydrogen, a halogen, a substituted or unsubstituted $C_{1-12}$ alkyl, a substituted or unsubstituted $C_{1-12}$ alkoxy, a substituted or unsubstituted $C_{1-12}$ alkenyl, a substituted or unsubstituted $C_{1-12}$ conjugated alkyl, a substituted or unsubstituted aryl group, or a substituted or unsubstituted heteroaryl group or the substituents together form an alkylene or alkenylene chain completing an aryl group.

9. The photochromic composition of claim 8, wherein the at least one material includes at least one polymer selected from the group consisting of polyacrylates, polymethacrylates, polyalkylmethacrylates, polyoxy(alkylene methacrylates), poly(alkoxylated phenol methacrylates), cellulose acetate, cellulose triacetate, cellulose acetate propionate, cellulose acetate butyrate, poly(vinyl acetate), poly(vinyl alcohol), poly(vinyl chloride), poly(vinylidene chloride), poly(vinylpyrrolidone), poly((meth)acrylamide), poly(dimethyl acrylamide), poly(hydroxyethyl methacrylate), poly((meth)acrylic acid), thermoplastic polycarbonates, polyesters, polyurethanes, polythiourethanes, poly(ethylene terephthalate), polystyrene, poly(alpha methylstyrene), copoly(styrene-methylmethacrylate), copoly(styrene-acrylonitrile), polyvinylbutyral, and polymers of members of the group consisting of polyol(allyl carbonate)monomers, mono-functional acrylate monomers, mono-functional methacrylate monomers, polyfunctional acrylate monomers, polyfunctional methacrylate monomers, diethylene glycol dimethacrylate monomers, diisopropenyl benzene monomers, alkoxylated polyhydric alcohol monomers, and diallylidene pentaerythritol monomers.

10. The photochromic composition of claim 8, wherein the at least one material includes at least a second material having a glass transition temperature less than about 0° C.

11. The photochromic composition of claim 10, wherein the at least one photochromic dye is coupled to the second material.

12. The photochromic composition of claim 8, wherein the at least one material includes at least one polysiloxane or at least one polyacrylate having a glass transition temperature less than about 0° C.

* * * * *